United States Patent
Craske (10) Patent No.: US 8,819,378 B2
(45) Date of Patent: Aug. 26, 2014

(54) DATA PROCESSING APPARATUS AND METHOD FOR PERFORMING MEMORY TRANSACTIONS WITHIN SUCH A DATA PROCESSING APPARATUS

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 295 days.

(21) Appl. No.: 13/295,475

(22) Filed: Nov. 14, 2011

(65) Prior Publication Data

US 2013/0124820 A1 May 16, 2013

(51) Int. Cl.
*G06F 12/00* (2006.01)

(52) U.S. Cl.
USPC .......................... 711/167; 711/163; 711/202

(58) Field of Classification Search
USPC ........................................ 711/167, 163, 202
See application file for complete search history.

(56) References Cited

U.S. PATENT DOCUMENTS

| | | | | |
|---|---|---|---|---|
| 5,303,349 A | * | 4/1994 | Warriner et al. | 710/62 |
| 2005/0021865 A1 | * | 1/2005 | Morimoto | 709/248 |
| 2011/0050710 A1 | * | 3/2011 | Sadowski et al. | 345/502 |

* cited by examiner

*Primary Examiner* — Reginald G. Bragdon
*Assistant Examiner* — Mehdi Namazi
(74) *Attorney, Agent, or Firm* — Nixon & Vanderhye P.C.

(57) ABSTRACT

A data processing apparatus has processing circuitry for executing a memory access instruction in order to generate a memory transaction comprising at least one address transfer specifying a memory address, and at least one associated data transfer specifying data to be accessed at the specified memory address. The apparatus is arranged to route each address transfer and associated data transfer via a first interface when the specified memory address is within a first memory address range, or to route each address transfer and associated data transfer via a second interface when the specified memory address is within a second memory address range and is further configured, when using the first interface, to execute the memory access instruction so as to cause each address transfer and associated data transfer to be presented at the first interface with a first relative timing.

12 Claims, 9 Drawing Sheets

MOV r0, #0

MOV r1, #1

MOV r2, #GPIO

STR r0, [r2]

STR r1, [r2]

STR r0, [r2]

STR r1, [r2]

FIG. 7

DATA PROCESSING APPARATUS AND METHOD FOR PERFORMING MEMORY TRANSACTIONS WITHIN SUCH A DATA PROCESSING APPARATUS

BACKGROUND OF THE INVENTION

1. Field of the Invention

The present invention relates to a data processing apparatus, and to a method for performing memory transactions within such a data processing apparatus.

2. Description of the Prior Art

Instruction sets provided for execution on the data processing apparatus, such as a processor core, will typically include a number of memory access instructions that, when executed, cause a memory transaction to be performed to move data between memory addresses in the memory address space and registers of a register file within the data processing apparatus. One type of memory access instruction is a store instruction used to store data from the register file to a specified memory address within the memory address space. Another example of a memory access instruction is a load instruction used to load data from a specified memory address in the memory address space into one or more registers of the register file.

The memory address space can be partitioned in a variety of ways, and hence whilst one or more portions of the memory address space may be reserved for actual memory, other portions of the memory address space may be associated with storage provided within devices other than memory. For example, a portion of the memory address space may be associated with storage within a display controller, another portion of the memory address space may be associated with storage within a universal asynchronous receiver/transmitter (UART) device used to translate data between parallel and serial forms (for example to allow serial communications over a computer or peripheral device serial port), etc.

Traditionally, a data processing apparatus such as a processor core would communicate with all of the devices associated with the memory address space via a single interface. Accordingly, within an integrated circuit containing the processor core, the processor core may have a single system interface for connecting the processor core to a system bus to which the various memory address space associated devices are also coupled.

More recently, it is known to provide a processor core with more than one interface via which communications with memory address space associated devices can be achieved. This hence allows the processor core to be coupled to different buses, employing different bus protocols. Memory accesses can then be directed via the appropriate interface, dependent on which bus the device being accessed is connected to.

Typically, different bus protocols have different characteristics, and hence by providing more than one bus, increased flexibility is provided with regard to how individual devices are coupled to the processor core, thereby for example allowing certain devices to be connected to a bus allowing higher throughput, whilst other devices are connected to a bus allowing higher latency, etc.

In systems where the processor core has more than one interface via which memory accesses can be performed, there have typically been two approaches for handling such memory accesses. In accordance with the first approach, the memory access instructions within the instruction set do not distinguish between the different interfaces being used, and hence any particular memory access instruction is executed in the same way, irrespective of which interface is being used to handle the required memory transaction for that memory access instruction. The separate interfaces then include the required circuitry to control performance of the memory transaction having regard to the relevant bus protocol. Hence, in such embodiments, the internal signals passing between the processing circuitry executing the memory access instruction and the relevant interface circuitry are identical irrespective of which interface circuitry is being used. This simplifies the operation of the processor core, but does not allow the processor core to take advantage of any of the performance benefits that may be associated with one of the interfaces. For example, if one of the interfaces is connected to a bus which can process memory transactions more quickly than the bus to which the other interface is connected, this performance benefit cannot be used to realise any performance benefit within the processor core itself, since the internal handling of the memory access instruction within the processor core is the same, irrespective of which interface is used.

An alternative approach which can be taken is to provide separate memory access instructions associated with the different interfaces. Hence, for a memory access to be performed via a first interface, a first type of memory access instruction may be used, whilst for an equivalent memory access to be performed via a second interface, a separate second type of memory access instruction may be used. Whilst this can allow the processor core to internally take advantage of any performance benefits that one interface may provide relative to the other interface, it significantly increases programming complexity, and hence is difficult to use in practice.

Accordingly, it would be desirable to provide an improved mechanism for performing memory transactions within a data processing apparatus, which allows the data processing apparatus to take advantage of performance benefits that may be available when using one interface, but without the requirement for separate memory access instructions to be provided within the instruction set in association with each memory interface.

SUMMARY OF THE INVENTION

Viewed from a first aspect, the present invention provides a data processing apparatus comprising: processing circuitry configured to execute a sequence of instructions including a memory access instruction, the processing circuitry including memory control circuitry configured to execute said memory access instruction to generate a memory transaction comprising at least one address transfer specifying a memory address and at least one associated data transfer specifying data to be accessed at the specified memory address; a first interface and a second interface; the memory control circuitry being configured to route each address transfer and associated data transfer via the first interface when the specified memory address is within a first memory address range, and to route each address transfer and associated data transfer via the second interface when the specified memory address is within a second memory address range; the memory control circuitry further being configured, when using the first interface, to execute the memory access instruction so as to cause each address transfer and associated data transfer to be presented at the first interface with a first relative timing; and the memory control circuitry further being configured, when using the second interface, to modify execution of the memory access instruction so as to cause each address transfer and associated data transfer to be presented at the second interface with a second relative timing different to said first relative timing.

In accordance with the present invention, the data processing apparatus has a first interface and a second interface, and the memory control circuitry used to execute the memory access instruction routes each address transfer and associated data transfer of the corresponding memory transaction via the first interface or via the second interface, dependent on the memory address specified for that memory access instruction. When the first interface is being used, the memory control circuitry executes the memory access instruction so as to cause each address transfer and associated data transfer to be presented at the first interface with a first relative timing. In contrast, when the second interface is being used, the memory control circuitry modifies execution of the memory access instruction so as to cause each address transfer and associated data transfer to be presented at the second interface with a second relative timing different to the first relative timing.

Hence, in accordance with the present invention, by executing the same memory access instruction differently dependent on which interface is being used for handling the memory transaction, the data processing apparatus is able to take advantage of any performance benefit available when using one of the interfaces rather than the other, without interface-specific memory access instructions being provided within the instruction set.

The memory address range associated with each interface does not need to specify a single continuous sequence of addresses, and instead multiple sub-ranges of addresses and/or individual addresses may collectively constitute the memory address range.

The memory control circuitry can be arranged in a variety of ways. However, in one embodiment, the memory control circuitry comprises buffer circuitry selectively employed during modified execution of the memory access instruction to achieve the second relative timing of each address transfer and associated data transfer as presented at the second interface. Hence, by internally buffering certain signals within the data processing apparatus, this allows each address transfer and associated data transfer to be presented at the second interface with the second relative timing (in this example it being assumed that the second relative timing provides a performance improvement when compared with the first relative timing), whilst freeing up resources within the data processing apparatus to enable advantage to be taken of the performance improvement (for example by increasing instruction throughput).

The first and second relative timings can take a variety of forms. However, in one embodiment, in accordance with the first relative timing, the memory control circuitry is configured to cause each address transfer and associated data transfer to be presented at the first interface during different clock cycles, whilst in accordance with the second relative timing, the memory control circuitry is configured to use the buffer circuitry in order to cause each address transfer and associated data transfer to be presented at the second interface during the same clock cycle.

In one embodiment, the memory control circuitry includes an address generator configured to generate the memory address for each address transfer, and the memory control circuitry is configured for at least one type of memory transaction, when using the second interface, to buffer each memory address generated by the address generator within the buffer circuitry for at least one clock cycle, such that each address transfer and associated data transfer is presented at the second interface during the same clock cycle.

Such an approach is beneficial if the computation required to create the relevant data transfer cannot be completed within the same cycle as the address transfer, for example because it takes more than one clock cycle to generate the required data transfer. In one embodiment, such a scenario arises when the memory transaction is a multi-beat memory transaction comprising multiple address transfers and associated data transfers, and hence for multi-beat memory transactions the above described buffering of each memory address can be used to ensure that each address transfer and associated data transfer can be presented at the second interface during the same clock cycle.

However, in one embodiment such buffering is not needed for single-beat memory transactions comprising a single address transfer and an associated single data transfer, since the data transfer can be generated internally within the same clock cycle as the address transfer.

The memory access instructions can be store instructions or load instructions, execution of a store instruction giving rise to performance of a write transaction in order to write data from the register file to one or more specified memory addresses, whilst execution of a load instruction giving rise to a read transaction used to read data into one or more registers of the register file from one or more specified memory addresses. In one embodiment, when the memory transaction is a read transaction, the memory control circuitry is configured for at least one type of read transaction, when using the second interface, to buffer the data of each data transfer as received at the second interface within the buffer circuitry for at least one clock cycle if the register file is not available to receive that data transfer at that time, so as to allow each address transfer and associated data transfer to be presented at the second interface during the same clock cycle.

There are a number of reasons why the register file may not be available to receive the data transfer at the time it is presented at the second interface. For example, in one embodiment, a handshake protocol that is used in association with the first interface can give rise to periods of time where the register file is unavailable. In particular, in one embodiment, a valid-ready handshake protocol is employed, and if the ready signal is not asserted in the cycle where the read data is presented at the second interface, the register file will not be able to receive that data transfer at that time, and accordingly use of the buffer enables this situation to be addressed by temporarily buffering that data transfer until such time as the register file can then receive it.

In one embodiment, the memory control circuitry is configured to buffer the data of the data transfer as received at the second interface for at least one clock cycle if the memory transaction is a single-beat memory transaction comprising a single address transfer and an associated single data transfer. However, in one particular embodiment, such an approach is not needed for a multi-beat memory transaction, since in that particular embodiment the register file is configured to always be available to receive the data transfers of a multi-beat memory transaction.

In one particular embodiment, when using the second interface, buffering is used for the memory address of each address transfer of a multi-beat memory transaction, and on some occasions for the read data of a single-beat read transaction. Since these buffering requirements will therefore not arise at the same time (since any particular memory transaction being processed will either be a multi-beat transaction requiring memory address buffering, or a single-beat transaction that may require read data buffering), the same physical buffer circuitry can be used to support both buffering functions, thereby providing both cost and area savings.

The first and second interfaces can take a variety of forms. In one embodiment, the first interface is used to interface the processing circuitry with a system bus to which a number of system devices are attached. The system bus can take a variety of forms, and indeed may operate in accordance with a variety of different bus protocols. In one particular embodiment, the system bus employs the AHB bus protocol developed by ARM Limited, Cambridge, United Kingdom.

The second interface can take a variety of forms, but in one embodiment is used to interface the processing circuitry with a general purpose input/output (GPIO) device. A dedicate I/O bus may be used to connect the second interface with the GPIO device. The protocol used over the I/O bus can be developed so as to maximise performance of the GPIO device.

Viewed from a second aspect, the present invention provides an integrated circuit comprising: a data processing apparatus in accordance with the first aspect of the present invention; a system bus coupled to said first interface; a number of system devices attached to said system bus; and a general purpose input/output device coupled to said second interface, said general purpose input/output device providing a plurality of input/output pins for said integrated circuit.

Viewed from a third aspect, the present invention provides a method of performing memory transactions within a data processing apparatus comprising a first interface, a second interface, and processing circuitry for executing a sequence of instructions including a memory access instruction, the method comprising: employing memory control circuitry within the processing circuitry to execute the memory access instruction to generate a memory transaction comprising at least one address transfer specifying a memory address and at least one associated data transfer specifying data to be accessed at the specified memory address; routing each address transfer and associated data transfer via the first interface when the specified memory address is within a first memory address range, and routing each address transfer and associated data transfer via the second interface when the specified memory address is within a second memory address range; when using the first interface, arranging the memory control circuitry to execute the memory access instruction so as to cause each address transfer and associated data transfer to be presented at the first interface with a first relative timing; and when using the second interface, arranging the memory control circuitry to modify execution of the memory access instruction so as to cause each address transfer and associated data transfer to be presented at the second interface with a second relative timing different to said first relative timing.

Viewed from a fourth aspect, the present invention provides a data processing apparatus comprising: processing means for executing a sequence of instructions including a memory access instruction, the processing means including memory control means for executing said memory access instruction to generate a memory transaction comprising at least one address transfer specifying a memory address and at least one associated data transfer specifying data to be accessed at the specified memory address; first interface means and second interface means; the memory control means for routing each address transfer and associated data transfer via the first interface means when the specified memory address is within a first memory address range, and for routing each address transfer and associated data transfer via the second interface means when the specified memory address is within a second memory address range; the memory control means for executing the memory access instruction, when using the first interface means, so as to cause each address transfer and associated data transfer to be presented at the first interface means with a first relative timing; and the memory control means further for modifying execution of the memory access instruction, when using the second interface means, so as to cause each address transfer and associated data transfer to be presented at the second interface means with a second relative timing different to said first relative timing.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
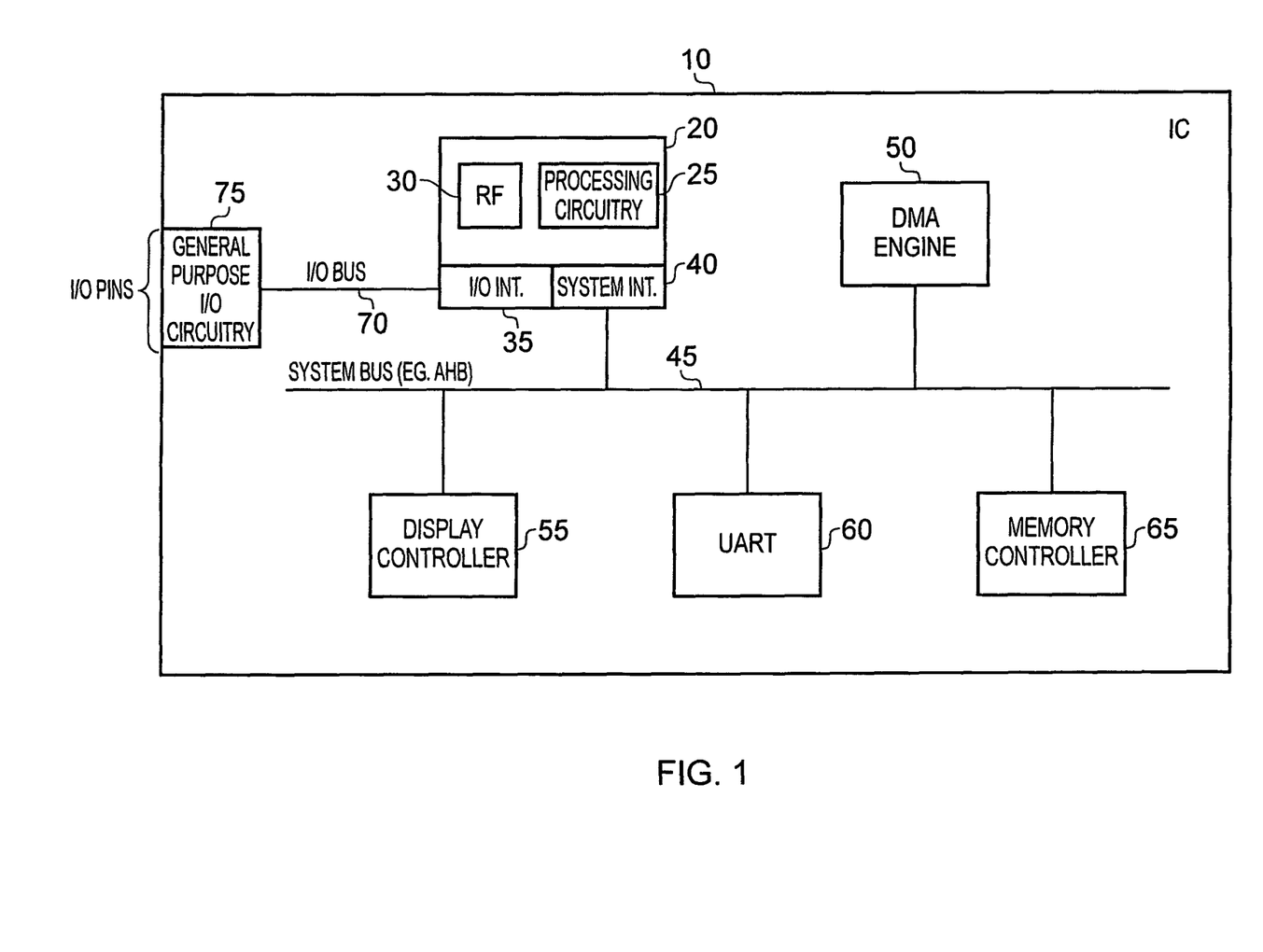
FIG. 1 is a block diagram of an integrated circuit including a data apparatus in accordance with one embodiment.

FIG. 1 is a block diagram of an integrated circuit 10 including a data processing apparatus in accordance with one embodiment, in this example the data processing apparatus taking the form of a processor core 20. The processor core 20 includes processing circuitry 25 for executing a sequence of instructions, and a register file 30 for reference by the processing circuitry 25 when executing those instructions. The instructions may include memory access instructions, for example a store instruction used to store data from a specified register of the register file 30 to a specified memory address, or a load instruction used to load data into a specified register of the register file 30 from a specified memory address.

Via such memory access instructions, the processor core 20 can access main memory via the memory controller 65 connected to the system bus 45, in this case execution of a memory access instruction causing a memory transaction to be routed via the system interface 40. However, in addition to main memory, other devices may also have storage associated with memory addresses within the memory address space. Hence, as illustrated in FIG. 1 by way of example, a number of other slave devices such as the display controller 55 and the UART device 60 may include storage which can be accessed via memory access instructions executed by the processor core 20. As with accesses to main memory via the memory controller 65, any memory access instructions specifying memory addresses residing within the display controller 55 or the UART 60 will result in memory transactions being issued via the system interface 40 onto the system bus 45.

In a typical integrated circuit, the processor core 20 will not be the only master device that may access memory addresses, and hence, by way of illustration, a direct memory access (DMA) engine 50 may also be coupled to the system bus 45 to allow it to access memory addresses residing within any of the devices coupled to the system bus 45.

The system bus can be arranged in a variety of ways, and may operate in accordance with any one of a number of known bus protocols. Purely by way of example, the system bus 45 may be constructed to operate in accordance with the AHB bus protocol developed by ARM Limited, Cambridge, United Kingdom.

As also shown in FIG. 1, an additional bus, namely the I/O bus 70, is provided allowing a general purpose I/O (GPIO) circuit 75 to be coupled to the processor core 20 via an associated I/O interface 35. The GPIO circuit 75 presents a plurality of I/O pins at the periphery of the integrated circuit allowing various devices to be coupled to the integrated circuit 10. Since the I/O bus 70 is used solely to provide a connection between the processor core 20 and the GPIO circuitry 75, the protocol used on the I/O bus 70 can be arranged to optimise performance of the GPIO circuitry 75. Access to the GPIO circuitry 75 can be achieved using memory access instructions, with a subset of the memory address space being associated with the GPIO circuitry 75.

Accordingly, when a memory access instruction is decoded within the processing circuitry 25, it is determined whether the address being accessed is within the memory address space associated with the GPIO circuitry 75, and if so the I/O interface 35 is used to handle the associated memory transaction, whereas if it is determined that the memory address being accessed is not within the memory address space associated with the GPIO circuitry 75, the associated memory transaction is instead handled via the system interface 40.

In accordance with embodiments of the present invention, the processing circuitry 25 includes memory control circuitry for executing each memory access instruction, and the way in which the memory control circuitry executes each memory access instruction varies dependent on whether the I/O interface 35 or the system interface 40 is being used, as will be discussed in more detail with reference to FIG. 2.

Figure 2:
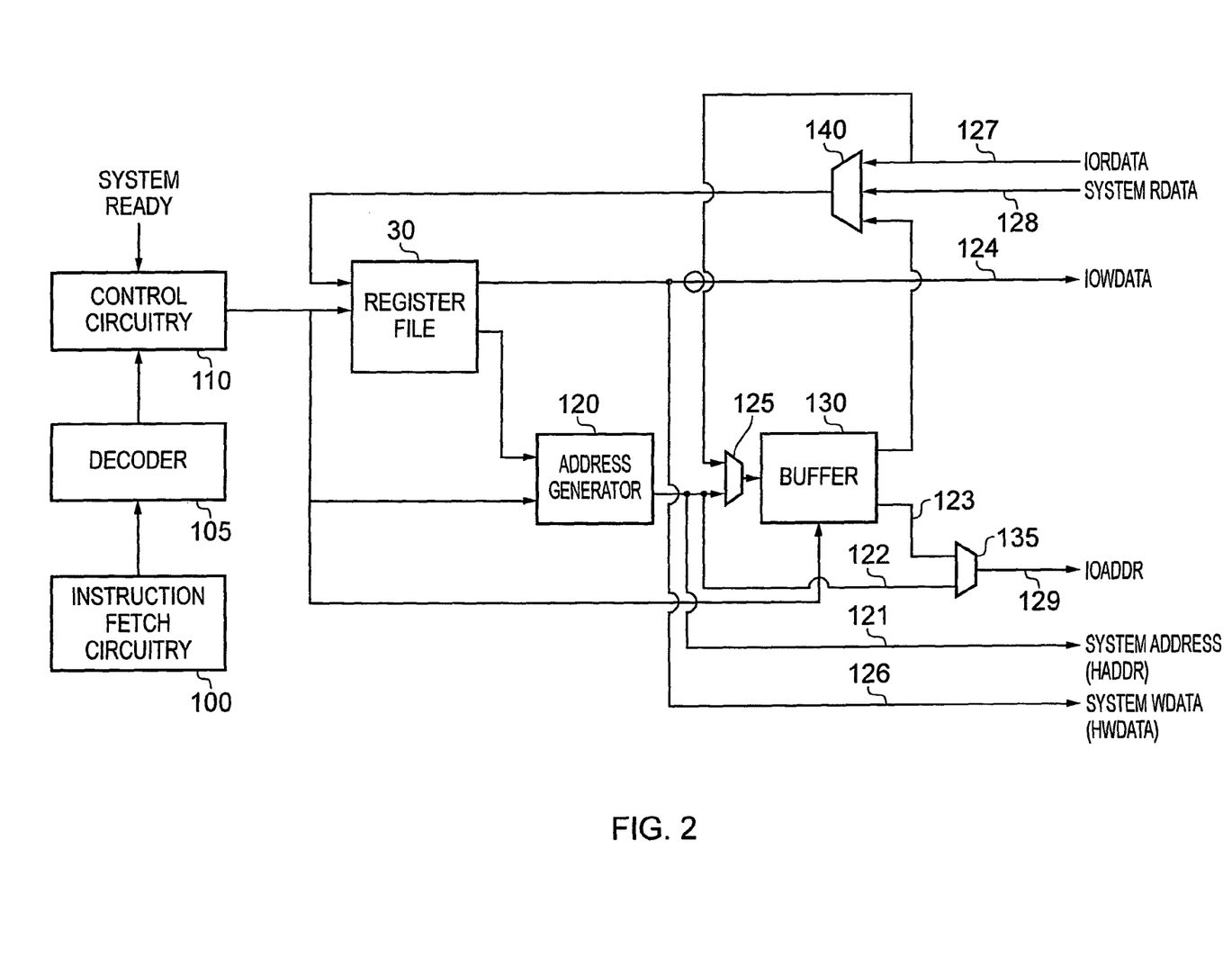
FIG. 2 is a block diagram illustrating components provided within the processor core 20 of FIG. 1 in accordance with one embodiment.

FIG. 2 illustrates circuitry provided within the processing circuitry 25 in accordance with one embodiment, in addition to showing how that circuitry is connected with the register file 30. Instruction fetch circuitry 100 is used to fetch each instruction for execution, whereafter a decoder 105 is used to decode the instruction in order to determine the type of operation required. Control circuitry 110 is then arranged to issue appropriate control signals to other components within the processing circuitry in order to cause the required operation to be performed. The control circuitry 110 also receives a system ready signal which is taken into account when generating the control signals.

FIG. 2 illustrates the components of the processing circuitry that are used when the decoder 105 determines that the current instruction is a memory access instruction, i.e. either a store instruction or a load instruction. Execution of each memory access instruction will result in performance of a memory transaction comprising at least one address transfer specifying a memory address and at least one associated data transfer specifying data to be accessed at the specified memory address (i.e. written to the specified memory address in the event of a store instruction, or read from the specified memory address in the event of a load instruction). Any particular memory access instruction may require the performance of a single-beat memory transaction comprising a single address transfers and an associated single data transfer, or may require performance of a multi-beat memory transaction comprising multiple address transfers and associated data transfers. For multi-beat memory transactions, the control circuitry 110 will control the generation of each address transfer and associated data transfer.

For each address transfer, the control circuitry will send a control signal to the address generator 120 to cause the address generator to generate a memory address for that address transfer. Typically the memory address is calculated with reference to the contents of a specified register within the register file 30, and accordingly the control circuitry will also cause the register file 30 to access the required register and output the data to the address generator 120 to enable the memory address to be generated. If it is determined that the memory address generated by the address generator 120 is associated with the GPIO circuit 75, the address generator will output the memory address over path 122 to the multiplexer 135, and that address will also be provided as one input to the multiplexer 125 used to provide input data to the buffer 130. As will be discussed in more detail later, for certain types of memory transaction performed in respect of the GPIO circuit, each memory address generated by the address generator 120 will be buffered for one cycle within the buffer 130, whereafter it will be provided over path 123 to the multiplexer 135 for outputting in the next cycle as the I/O address. However, for other types of memory transaction, such buffering will not be required, and the memory address as provided over path 122 can be output directly as the I/O address. The control circuitry 110 will control the multiplexer 135 to ensure that either the non-buffered or the buffered memory address, as appropriate, is output from the I/O interface 35 as the I/O address over path 129.

If it is determined that the memory address generated by the address generator 120 is not associated with the GPIO circuit 75, then the generated address will be output from the system interface 40 over path 121 as the system address.

For store instructions, the memory transaction performed will be a write transaction, and write data will be output from the register file 30 under the control of the control circuitry 110. When the memory transaction is directed to the GPIO circuit 75, the write data output from the register file 30 will be output from the I/O interface 35 over path 124, whereas if the memory address is not associated with the GPIO circuit 75, then the write data will be output via the system interface 40 over path 126.

When executing a load instruction, a read memory transaction will be performed, with the read data being returned over path 127 from the I/O interface 35 in the event of a read transaction performed in respect of the GPIO circuit 75, or over path 128 from the system interface 40 for any other read transactions. The multiplexer 140 will be controlled by the control circuitry 110 in order to route the relevant input read data to the register file 30. When using the I/O interface 35, a situation can arise where valid read data is presented on path 127 but the register file 30 is not at that time available to store the data. In that eventuality, the read data is routed to the multiplexer 125 for storage within the buffer 130. When the register file is subsequently available, that data can then be output from the buffer and routed via the multiplexer 140 to the register file 30.

All of the components illustrated in FIG. 2 other than the register file 30 reside within the processor circuitry 25, with paths 129, 124 and 127 being connected to the I/O interface 35, and with paths 121, 126 and 128 being connected to the system interface 40. As shown in FIG. 2, for any particular memory access instruction, the way in which the memory control circuitry of the processing circuitry executes that instruction varies dependent on whether the associated memory transaction is to be routed via the I/O interface 35 or via the system interface 40.

Figure 3A:
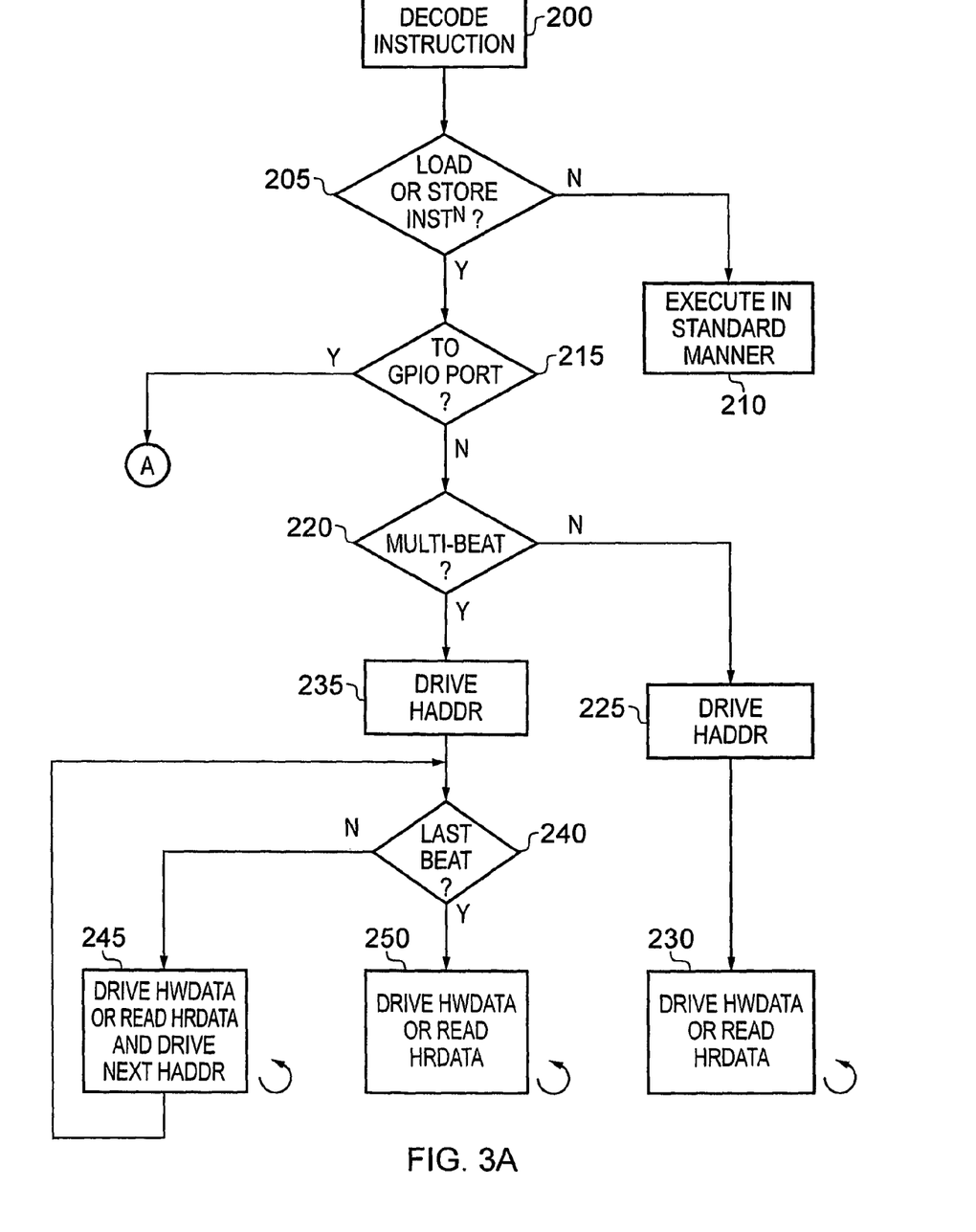
FIGS. 3A and 3B provide a flow diagram illustrating how load or store instructions are handled in accordance with one embodiment.
Figure 3B:
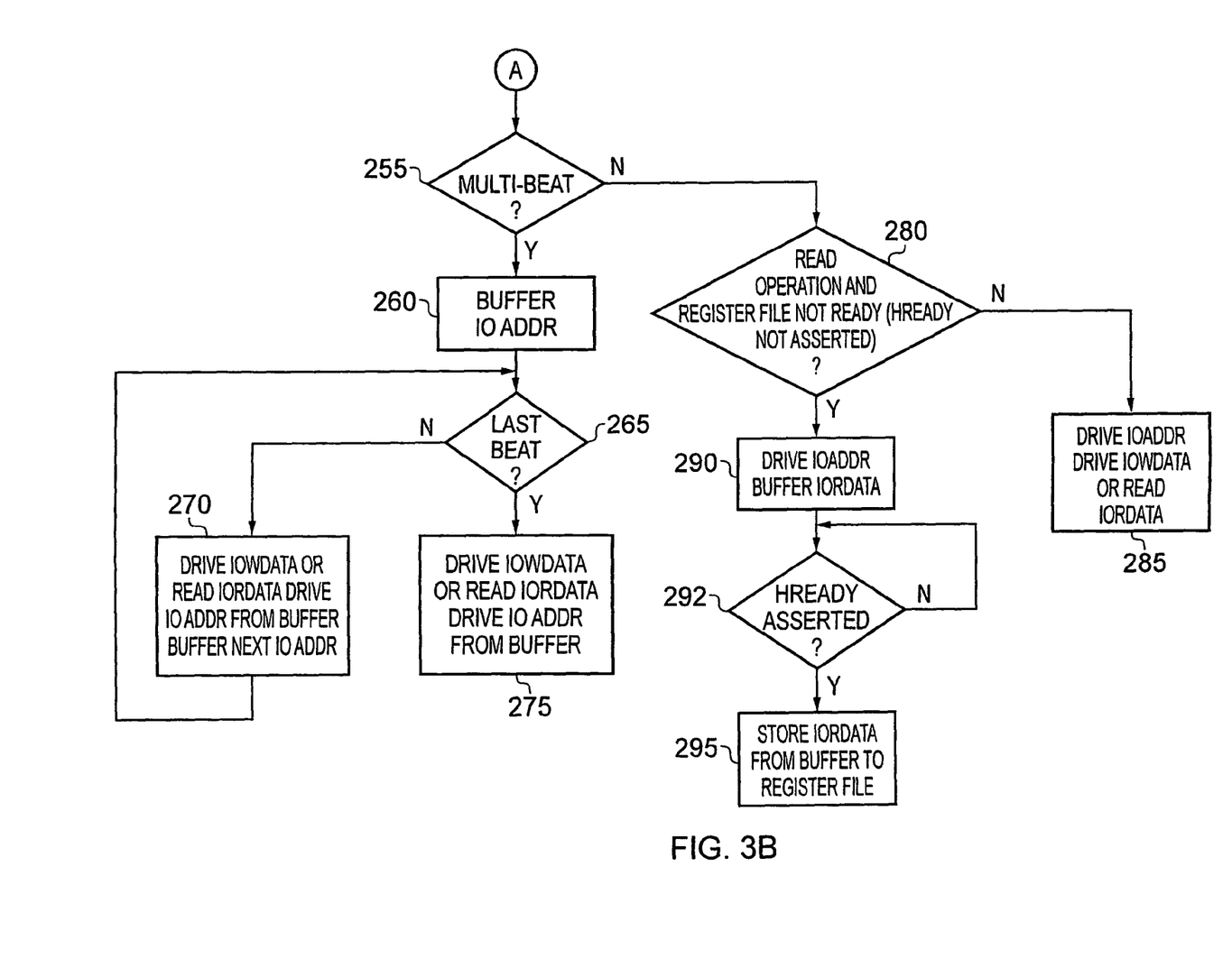

FIGS. 3A and 3B provide a flow diagram illustrating how load or store instructions are executed by the circuitry of FIG. 2 in accordance with one embodiment. At step 200, the instruction is decoded by the decoder 105, whereafter it is determined whether the instruction is a load or store instruction at step 205. If not, the instruction is executed in the standard manner at step 210. However, if the instruction is a load instruction or a store instruction, the process proceeds to step 215, where it is determined whether that instruction requires a memory access to the GPIO port.

If the instruction does not require an access to the GPIO port, then this means that the system interface 40 will be used. At step 220 it is then determined whether a multi-beat transaction is required to process the instruction, and if not the system address generated by the address generator 120 is output at step 225. Then, in the next clock cycle, the write data is driven out over path 126 from the register file 30 in the event of a write transaction, or the read data received over path 128 is read in the event of a read transaction (step 230). A valid-ready handshake protocol is used on the system bus, and if the ready signal is not asserted, step 230 is repeated each clock cycle until the ready signal is asserted.

If at step 220 it is determined that a multi-beat transaction is required, then the system address is driven out over path 121 at step 235, whereafter it is determined whether the last beat of the multi-beat transaction is being handled. If not, the process proceeds to step 245, where in the next clock cycle the write data is driven out over path 126 or the read data present on path 128 is read as appropriate. In addition, the next system address is output over path 121. As with step 230, if the ready signal is not asserted when step 245 is performed, step 245 is repeated each clock cycle until the ready signal is asserted, whereafter the process returns to step 240. When the last beat is encountered, the process proceeds to step 250, where the write data is driven out over path 126, or the read data presented on path 128 is read. Again, in the presence of a de-asserted ready signal, step 250 is repeated until the ready signal is asserted.

If at step 215, it is determined that the access to be performed is directed to the GPIO port, then the process branches to the sequence of steps shown in FIG. 3B. In particular, at step 255, it is determined whether a multi-beat transaction is required, and if so the process proceeds to step 260 where the memory address generated by the address generator 120 is buffered within the buffer 130. Thereafter, at step 265, it is determined whether the last beat of the transaction is being performed, and if not the process proceeds to step 270, where the address in the buffer is output over path 129 in the same clock cycle as the write data is output over path 124, or the read data present on the read path 127 is sampled. During the same clock cycle, the next memory address is also buffered within the buffer 130. The process then returns to step 265.

When the last beat is encountered at step 265, the process proceeds to step 275, where the address in the buffer is output over path 129 during the same clock cycle that the write data is output over path 124 or the read data present on path 127 is sampled.

When handling multi-beat transactions to the GPIO port, the described embodiment is configured so that the ready signal is always asserted, and accordingly the register file 30 will always be available. However, in the described embodiment this is not always the case for single-beat transactions to the GPIO port. Accordingly, as shown in FIG. 3B, in the event of a single-beat transaction being detected at step 255, it is then determined at step 280 whether the operation being performed is a read operation and, if it is, whether the register file is not ready (i.e. in this embodiment the HREADY signal is not asserted). If it is determined that the operation is not a read operation, or is a read operation but the register file is ready, then the process proceeds to step 285, where the address produced by the address generator is output directly over path 129 without being buffered, and during the same clock cycle the write data is driven over path 124 (in the event of a write transaction), or the read data present on path 127 is sampled (in the event of a read transaction).

However, if it is determined at step 280 that the operation being performed is a read operation and the register file is not ready, then at step 290 the memory address is output directly over path 129 without buffering, but in the same clock cycle the read data present on path 127 is stored in the buffer 130.

It is then determined at step 292 whether the HREADY signal has been asserted, and once the HREADY signal is asserted, the read data that has been temporarily buffered in the buffer 130 is routed via the multiplexer 140 to the register file 30 for storing in the register file at step 295.

Figure 4A:
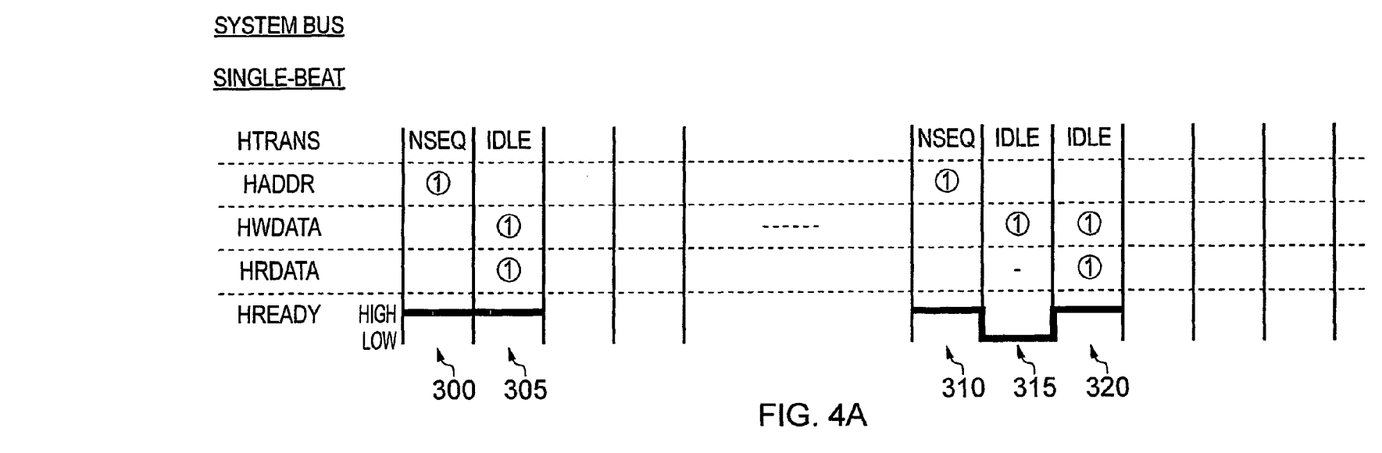
FIGS. 4A and 4B are timing diagrams illustrating the handling of single-beat and multi-beat memory transactions via the system interface of FIG. 1 in accordance with one embodiment.
Figure 4B:
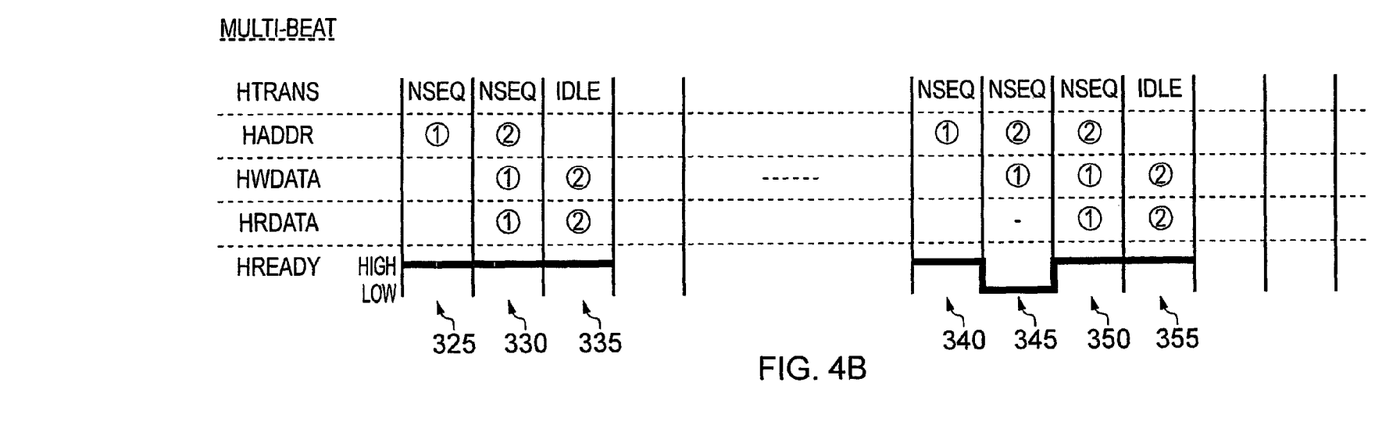

FIGS. 4A and 4B are diagrams schematically illustrating the timing of various signals at the system interface 40 when handling both single-beat and multi-beat transactions. In the example of FIG. 2, the HTRANS signal and HREADY signal were omitted for simplicity. The HTRANS signal is a signal identifying whether a valid address is being asserted for a transaction, whilst the HREADY signal is part of the valid-ready handshake protocol discussed earlier. In the left hand side of FIG. 4A, a single-beat transaction is illustrated, and it is assumed that the HREADY signal stays asserted for both of the clock cycles 300, 305. In the first clock cycle 300, the address is asserted with the HTRANS signal being set to identify valid address data. In the second clock cycle, the HTRANS signal is de-asserted to identify there is no valid address data being output, but in this clock cycle the write data is asserted for a write transaction, or the read data is sampled for a read transaction.

The right hand side of FIG. 4A shows the same transaction, but where the ready signal is de-asserted in the second clock cycle. Accordingly, in the first clock cycle 310, the address is asserted with the HTRANS signal being set to identify that valid address data is being output. In the second clock cycle, the HREADY signal is de-asserted. During this cycle, the write data is driven on path 126 through the system interface 40. However, given the de-asserted ready signal, the recipient for that write data will not receive the data, and accordingly it has to be driven again in the subsequent clock cycle 320.

For a read transaction, since the ready signal is de-asserted in the clock cycle 315, the read data is not sampled, but will be sampled in the subsequent clock cycle 320 when the ready signal is asserted again.

FIG. 4B illustrates the timing for a multi-beat transaction, in this example a two-beat transaction. In the left hand side of FIG. 4B, an example is shown where it is assumed that the HREADY signal stays asserted for all three clock cycles. Accordingly the address for the first beat is asserted in clock cycle 325, and then in the second clock cycle 330 the write data is driven, or the read data is sampled, as appropriate, for that first beat. Also during the second clock cycle, the address for the second beat is asserted. In the third clock cycle 335, the write data is driven, or the read data is sampled, as appropriate, for the second beat.

In the right hand side of FIG. 4B, the same transaction is illustrated, but here it is assumed that the HREADY signal is de-asserted for the second clock cycle. Accordingly, the signals in the first clock cycle 340 are the same as they were in the first clock cycle 325. However, due to the HREADY signal being de-asserted in the clock cycle 345, the address asserted for the second beat needs to continue to be asserted in the third clock cycle 350 where the HREADY signal is reasserted. Similarly, the write data driven in clock cycle 345 needs to be driven again in clock cycle 350. For a read transaction, any data present on the read path 128 is ignored in the second clock cycle 345, and is sampled in the clock cycle 350. The signals in the fourth clock cycle 355 are then the same as in the third clock cycle 335 of the earlier example.

As can be seen from FIGS. 4A and 4B, irrespective of whether single-beat or multi-beat transactions are being handled, each beat takes at least two cycles to complete, with a separate address phase and a separate data phase.

Figure 5A:
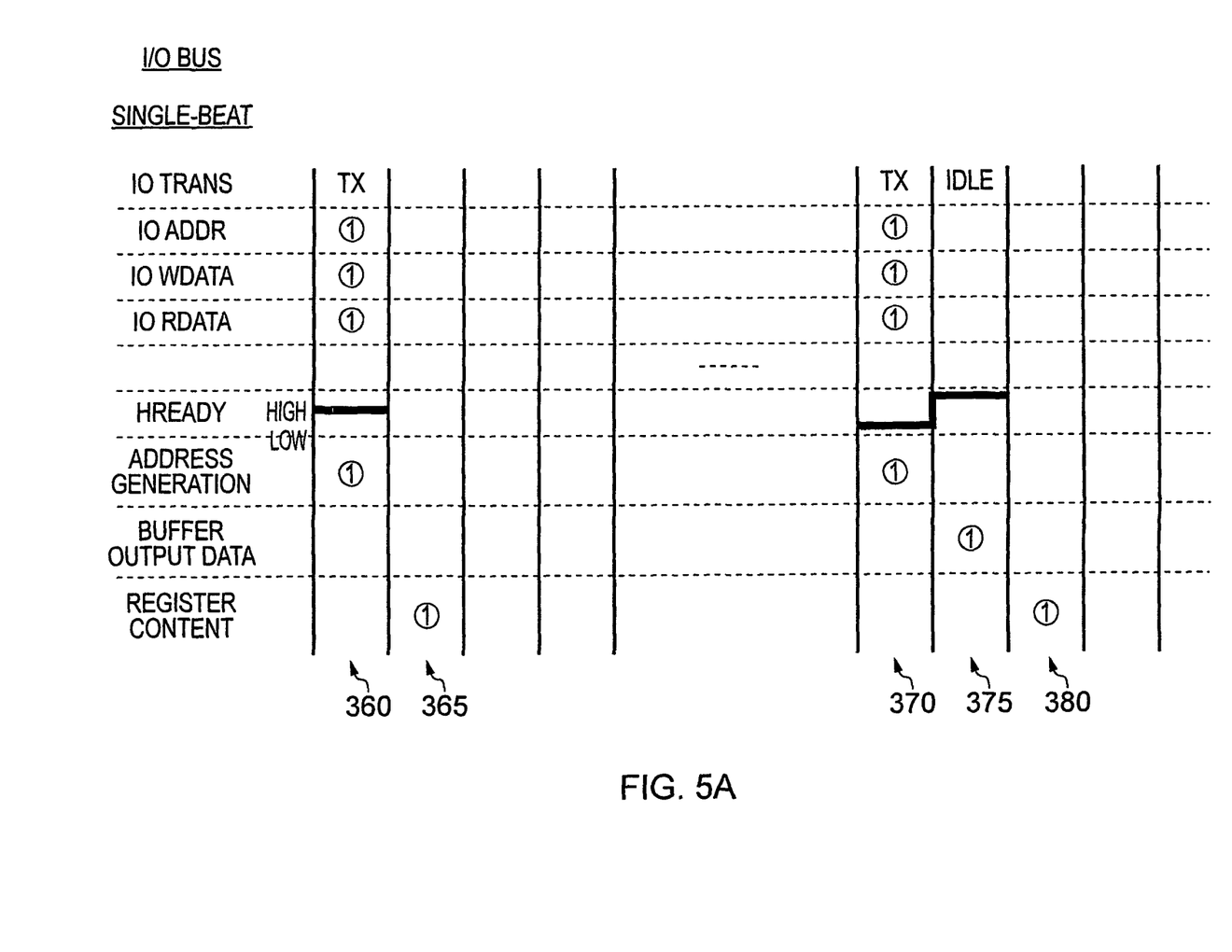
FIGS. 5A and 5B are timing diagrams illustrating the handling of single-beat and multi-beat memory transactions via the input/output interface of FIG. 1 in accordance with one embodiment.

FIG. 5A illustrates various signals presented on the I/O bus 70 when handling a single-beat transaction, along with a variety of other signals which, though not presented on the I/O bus 70, are provided in the figure to illustrate how operations performed by the processing circuitry 25 when executing the memory access instruction are used to achieve the timing on the I/O bus. In particular, only the top four signals are actually present on the I/O bus 70. The IOTRANS signal was omitted for simplicity in FIG. 2, but is set to identify when a valid address is being issued. In the example in the left hand side of FIG. 5A, it is assumed that the HREADY signal is high. Whilst this signal is not used on the I/O bus 70, it will affect whether the register file 30 is available to receive read data in the event of a read transaction performed via the I/O bus 70. Assuming the HREADY signal is high, then in the first clock cycle 360, an address is generated by the address generator 120 and is output directly as the I/O address signal. The write data, or in the event of a read transaction the read data, is also driven/sampled in this first clock cycle. No buffering is performed within the buffer 130. For a read transaction, the register will be updated based on the sampled read data during the first clock cycle 360, so that that data becomes available from the register in the subsequent clock cycle 365.

The right hand side of FIG. 5A shows the same transaction, but where the HREADY signal is low during the cycle in which the transaction takes place. As shown in FIG. 5A, the signals presented on the I/O bus are the same in the first clock cycle 370 as they were within the first clock cycle 360, but due to the HREADY signal being de-asserted, the read data is buffered within the buffer 130. As a result, that buffered data is available at the output of the buffer in the next clock cycle 375, and due to the HREADY signal now being asserted that data will be provided via the multiplexer 140 as an input to the register file 30, causing that data to be stored into the register file during the second clock cycle 375. As a result, that data will be available from the register file in the next clock cycle 380.

Figure 5B:
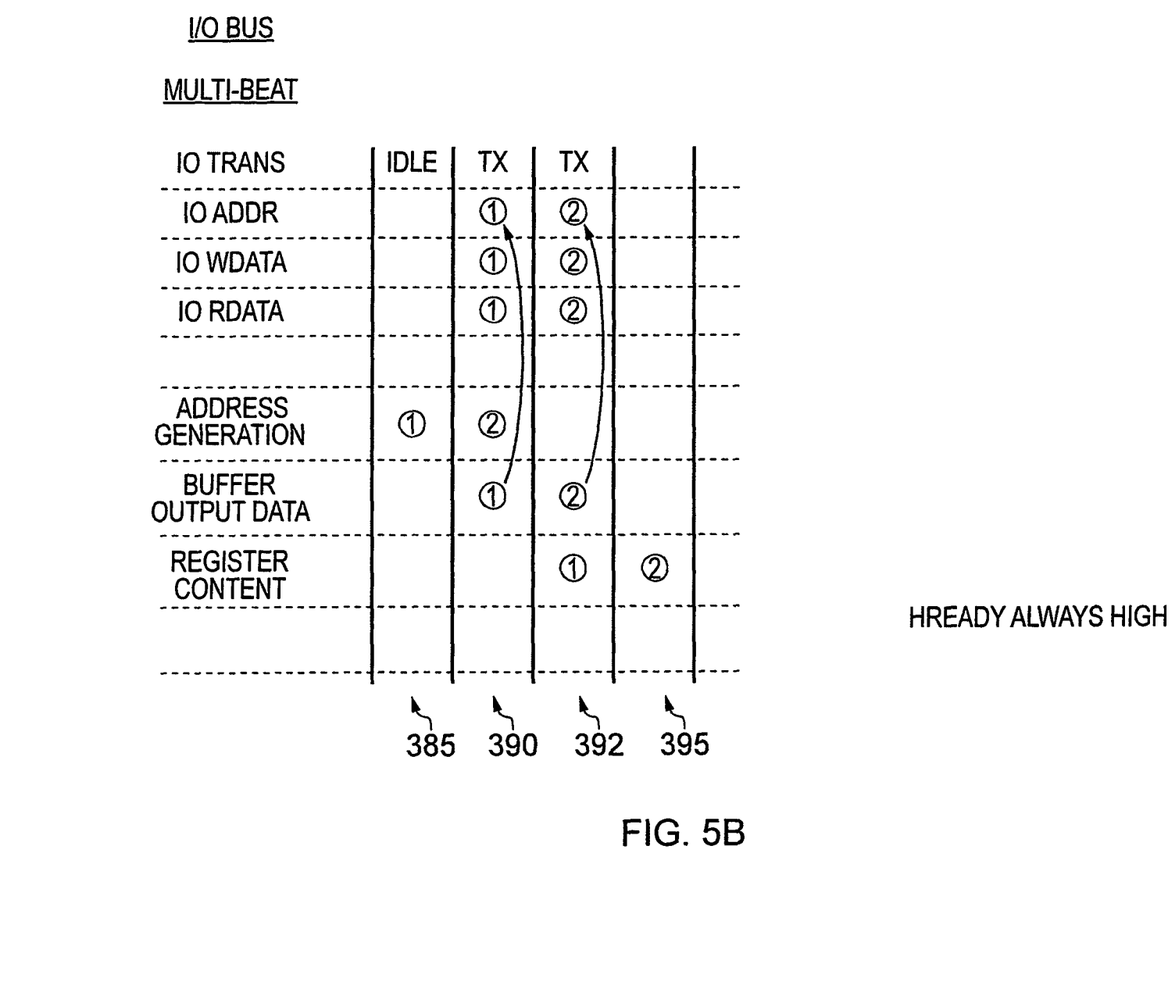

FIG. 5B illustrates how multi-beat transactions are handled on the I/O bus. Again, only the top four signals are actually present on the I/O bus, and the remaining signals illustrate how the memory access instruction is executed within the processing circuitry 25 in order to allow the signals to be presented on the I/O bus as shown in the top part of the figure. In the embodiment illustrated, it is not possible for the processing circuitry 25 to be in a position to provide the required data for the data transfer in a single cycle, but instead two cycles are required to create that data. Accordingly, the address generation by the address generator 120 takes place in a clock cycle 385 where no signals are asserted on the I/O bus in relation to that transaction, and instead the address generated is stored within the buffer 130. As a result, in the next clock cycle 390, the address as stored in the buffer is available for output from the buffer, and by this time the required data for the data transfer is also available. As a result, during the second clock cycle 390, the buffered address is output on the I/O bus and during the same clock cycle the write data is asserted (in the event of a write transaction), or the read data is sampled (in the event of a read transaction). Also during this clock cycle, the address generator 120 generates the address for the next beat, and that address is stored within the buffer 130.

Accordingly, in the next clock cycle 392, the address and data transfers for the second beat are asserted. For read transactions, the register file will be updated with the read data for the first beat during the clock cycle 390, and accordingly that data will be available from the register in the subsequent clock cycle 392. Similarly, the read data for the second beat will be stored within the register file in the clock cycle 392, and hence will be available from the register in the subsequent clock cycle 395.

In the described embodiment, the apparatus is arranged such that the HREADY signal will always be high whilst performing a multi-beat transaction in respect of the GPIO circuits 75.

From FIGS. 5A and 5B, it will be seen that each beat of a memory transaction will take place in a single cycle on the I/O bus 70, with the memory address being generated and buffered in the cycle beforehand, to allow this to occur.

Hence, in accordance with the above described embodiments, the core 20 is provided with a system interface 40 where the address transfer and the corresponding data transfer occur in different clock cycles, but is also provided with an I/O interface 35 where the address transfer and corresponding data transfer occur within the same clock cycle. When performing single-beat transactions over the I/O bus, both the address transfer and data transfer for that single-beat transaction are presented in what would have been the address transfer cycle had the system interface 40 been used, with the system interface then free to perform instruction fetches to accommodate the increased instruction throughput resulting from the single-beat load/store transaction now taking one cycle rather than two. For the case where the HREADY signal is de-asserted when a read transaction is taking place via the I/O bus, the data read from the I/O read port is diverted into the buffer 130, from where it is committed to the register file when the HREADY signal on the system bus is subsequently asserted.

For multi-beat transactions handled via the I/O bus 70, the complexities involved in computing the information required for the data transfer mean that it cannot be computed in a single cycle, and hence is not available until the cycle which would have corresponded with the data transfer cycle on the system bus 40 had the system bus been used. Accordingly, in this case, the address is produced in the cycle that would have corresponded to the address transfer cycle had the system bus 40 been used, but is buffered within the buffer 130 rather than being output on the I/O bus in that cycle. It is then output on the I/O bus along with the data in what would have been the data transfer cycle had the system interface 40 been used. As the effective timing visible to the processor core is identical, the functional changes required by the processor are minimised, and no additional work is required to accommodate a change in instruction throughput in the case of multi-beat load/stores.

Figure 6:
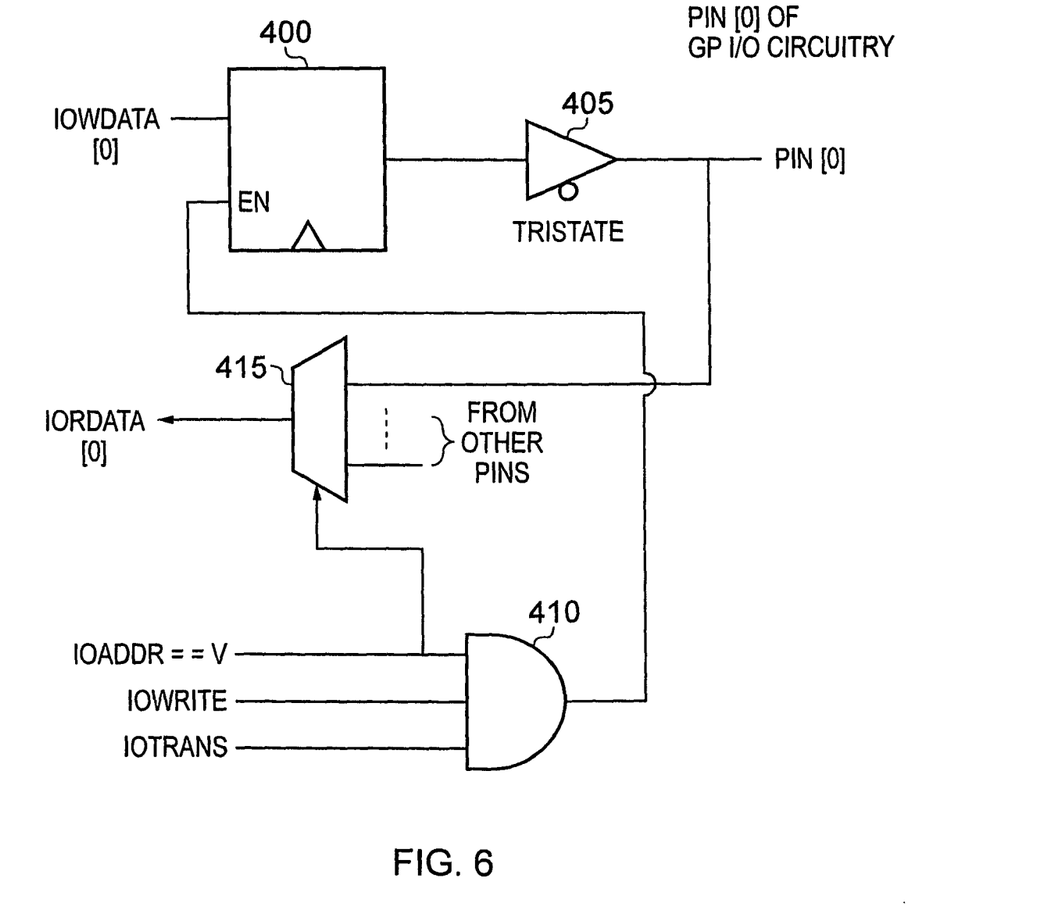
FIG. 6 is a diagram schematically illustrating components provided within the GPIO circuitry of FIG. 1 in accordance with one embodiment.

FIG. 6 illustrates components provided within the GPIO circuit 75 for a particular pin in accordance with one embodiment, in this example the components being shown for pin zero. The components shown will typically be replicated for each of the other pins, although some of the functionality of the AND gate 410 will be shared across the multiple pins since the IOWRITE and IOTRANS signals are pin independent. In the event of a valid write operation, the IOWRITE and IOTRANS signals will be set high. If the address presented then matches with the pin zero address, the output from the AND gate 410 will be set high, thereby causing the storage element 400 to sample the write data presented at its input. That write data will then be output via the tristate buffer 405 as the pin zero output. For a read transaction, the read data is provided by the output of the multiplexer 415, the multiplexer receiving at its input the values from any pins that can be used to provide bit zero of the read data. For example, in a banked arrangement, multiple of the pins can be mapped to bit zero of the read data. If the address asserted matches the address for pin zero, then the input to the multiplexer from pin zero will be output by the multiplexer 415 as the read data for bit position zero.

Figure 7:
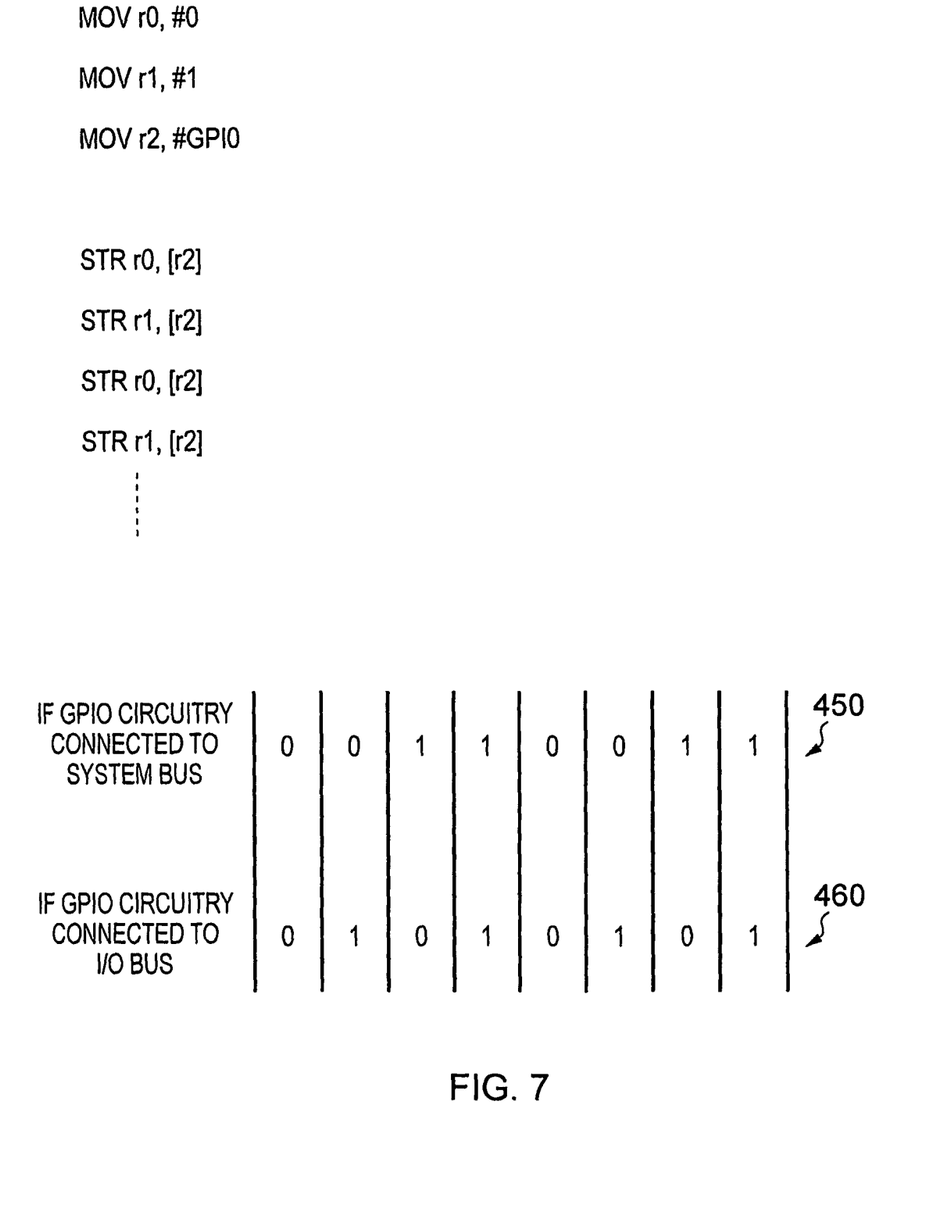
FIG. 7 schematically illustrates how a performance improvement can be realised when performing a particular sequence of memory access operations via the input/output interface in accordance with one embodiment.

FIG. 7 illustrates an example sequence of code that may be executed by the processing circuitry 25, and illustrates the performance benefit that can be realised when the general purpose I/O circuitry 75 is connected to the I/O bus 70 as shown in FIG. 1, rather than being connected to the general system bus 45. The three move instructions illustrated are used to move the value 0 into register 0, the value 1 into register 1, and the memory address corresponding to one or more of the I/O pins of the GPIO circuit into register 2. The sequence of store instructions then serve to write 0, 1, 0, 1 . . . repetitively to the pins identified by the contents of register 2. As will be appreciated from the timing illustrated in FIGS. 4A and 4B, if the GPIO circuit had been connected to the system interface 40, each write operation would take two cycles to complete, and hence the resultant square wave output from the relevant pins would be at a logic zero value for two cycles, a logic one value for two cycles, etc, as shown by the sequence 450 in FIG. 7. However, when using the GPIO circuit connected to the I/O bus 70 in accordance with the above described embodiments, each write operation takes a single cycle, and accordingly the square wave can oscillate every cycle, thereby increasing the frequency of the square wave obtainable by a factor of two.

From the above described embodiments, it can be seen that such embodiments enable the performance benefits available when using a particular interface to be used to improve the performance of the processor core by causing each memory access instruction to be executed differently dependent on whether the required access is to take place via the system interface 40 or via the I/O interface 35. This is achieved without requiring separate instructions to be provided within the instruction set for each type of interface.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus comprising:
   processing circuitry configured to execute a sequence of instructions including a memory access instruction, the processing circuitry including memory control circuitry configured to execute said memory access instruction to generate a memory transaction comprising at least one address transfer specifying a memory address and at least one associated data transfer specifying data to be accessed at the specified memory address;
   a first interface and a second interface;
   the memory control circuitry being configured to route each address transfer and associated data transfer via the first interface when the specified memory address is within a first memory address range, and to route each address transfer and associated data transfer via the second interface when the specified memory address is within a second memory address range;
   the memory control circuitry further being configured, when using the first interface, to execute the memory access instruction so as to cause each address transfer and associated data transfer to be presented at the first interface with a first relative timing; and
   the memory control circuitry further being configured, when using the second interface, to modify execution of the memory access instruction so as to cause each address transfer and associated data transfer to be presented at the second interface with a second relative timing different to said first relative timing, wherein the memory control circuit comprises buffer circuitry selectively employed during modified execution of the memory access instruction to achieve the second relative timing of each address transfer and associated data transfer as presented at the second interface, wherein:
   the memory control circuitry includes an address generator configured to generate the memory address for each address transfer; and
   the memory control circuitry is configured for at least one type of memory transaction, when using the second interface, to buffer each memory address generated by the address generator within the buffer circuitry for at least one clock cycle, such that each address transfer and associated data transfer is presented at the second interface during the same clock cycle, wherein the memory control circuitry is configured not to buffer the memory address generated by the address generator if the memory transaction is a single-beat memory transaction comprising a single address transfer and an associated single data transfer.

2. A data processing apparatus as claimed in claim 1, wherein:
   in accordance with the first relative timing, the memory control circuitry is configured to cause each address transfer and associated data transfer to be presented at the first interface during different clock cycles; and
   in accordance with the second relative timing, the memory control circuitry is configured to use the buffer circuitry in order to cause each address transfer and associated data transfer to be presented at the second interface during the same clock cycle.

3. A data processing apparatus comprising:
   processing circuitry configured to execute a sequence of instructions including a memory access instruction, the processing circuitry including memory control circuitry configured to execute said memory access instruction to generate a memory transaction comprising at least one address transfer specifying a memory address and at least one associated data transfer specifying data to be accessed at the specified memory address;
   a first interface and a second interface;
   the memory control circuitry being configured to route each address transfer and associated data transfer via the first interface when the specified memory address is within a first memory address range, and to route each address transfer and associated data transfer via the second interface when the specified memory address is within a second memory address range;

the memory control circuitry further being configured, when using the first interface, to execute the memory access instruction so as to cause each address transfer and associated data transfer to be presented at the first interface with a first relative timing; and the memory control circuitry further being configured, when using the second interface, to modify execution of the memory access instruction so as to cause each address transfer and associated data transfer to be presented at the second interface with a second relative timing different to said first relative timing, wherein the memory control circuitry comprises buffer circuitry selectively employed during modified execution of the memory access instruction to achieve the second relative timing of each address transfer and associated data transfer as presented at the second interface, wherein:

the memory transaction is a read transaction causing data to be read from memory into at least one register of a register file accessible to the processing circuitry;

the memory control circuitry is configured for at least one type of read transaction, when using the second interface, to buffer the data of each data transfer as received at the second interface within the buffer circuitry for at least one clock cycle if the register file is not available to receive that data transfer at that time, so as to allow each address transfer and associated data transfer to be presented at the second interface during the same clock cycle.

4. A data processing apparatus as claimed in claim 1, wherein the memory control circuitry is configured to buffer each memory address generated by the address generator for at least one clock cycle if the memory transaction is a multi-beat memory transaction comprising multiple address transfers and associated data transfers.

5. A data processing apparatus as claimed in claim 1, wherein the first interface is used to interface the processing circuitry with a system bus to which a number of system devices are attached.

6. A data processing apparatus as claimed in claim 1, wherein the second interface is used to interface the processing circuitry with a general purpose input/output device.

7. An integrated circuit comprising:
a data processing apparatus as claimed in claim 1;
a system bus coupled to said first interface;
a number of system devices attached to said system bus; and
a general purpose input/output device coupled to said second interface, said general purpose input/output device providing a plurality of input/output pins for said integrated circuit.

8. A data processing apparatus as claimed in claim 3, wherein:
the memory control circuitry includes an address generator configured to generate the memory address for each address transfer; and
the memory control circuitry is configured for at least one type of memory transaction, when using the second interface, to buffer each memory address generated by the address generator within the buffer circuitry for at least one clock cycle, such that each address transfer and associated data transfer is presented at the second interface during the same clock cycle.

9. A data processing apparatus as claimed in claim 3, wherein the memory control circuitry is configured to buffer the data of the data transfer as received at the second interface for at least one clock cycle if the memory transaction is a single-beat memory transaction comprising a single address transfer and an associated single data transfer.

10. A data processing apparatus as claimed in claim 3, wherein if the memory transaction is a multi-beat memory transaction comprising multiple address transfers and associated data transfers, the register file is configured to always be available to receive the data transfers of the multi-beat memory transaction, and the memory control circuitry is configured not to buffer the data of each data transfer.

11. A method of performing memory transactions within a data processing apparatus comprising a first interface, a second interface, and processing circuitry for executing a sequence of instructions including a memory access instruction, the method comprising:

employing memory control circuitry within the processing circuitry to execute the memory access instruction to generate a memory transaction comprising at least one address transfer specifying a memory address and at least one associated data transfer specifying data to be accessed at the specified memory address;

routing each address transfer and associated data transfer via the first interface when the specified memory address is within a first memory address range, and routing each address transfer and associated data transfer via the second interface when the specified memory address is within a second memory address range;

when using the first interface, arranging the memory control circuitry to execute the memory access instruction so as to cause each address transfer and associated data transfer to be presented at the first interface with a first relative timing; and when using the second interface, arranging the memory control circuitry to modify execution of the memory access instruction so as to cause each address transfer and associated data transfer to be presented at the second interface with a second relative timing different to said first relative timing;

selectively employing buffer circuitry within the memory control circuitry during modified execution of the memory access instruction to achieve the second relative timing of each address transfer and associated data transfer as presented at the second interface;

using an address generator within the memory control circuitry to generate the memory address for each address transfer;

for at least one type of memory transaction, when using the second interface, buffering each memory address generated by the address generator within the buffer circuitry for at least one clock cycle, such that each address transfer and associated data transfer is presented at the second interface during the same clock cycle; and not buffering the memory address generated by the address generator if the memory transaction is a single-beat memory transaction comprising a single address transfer and an associated single data transfer.

12. A data processing apparatus comprising:
processing means for executing a sequence of instructions including a memory access instruction, the processing means including memory control means for executing said memory access instruction to generate a memory transaction comprising at least one address transfer specifying a memory address and at least one associated data transfer specifying data to be accessed at the specified memory address;

first interface means and second interface means;
the memory control means for routing each address transfer and associated data transfer via the first interface means when the specified memory address is within a first memory address range, and for routing each address transfer and associated data transfer via the second interface means when the specified memory address is within a second memory address range;

the memory control means for executing the memory access instruction, when using the first interface means, so as to cause each address transfer and associated data transfer to be presented at the first interface means with a first relative timing; and the memory control means further for modifying execution of the memory access instruction, when using the second interface means, so as to cause each address transfer and associated data transfer to be presented at the second interface means with a second relative timing different to said first relative timing;

wherein the memory control means comprises buffer means selectively employed during modified execution of the memory access instruction for achieving the second relative timing of each address transfer and associated data transfer as presented at the second interface means;

wherein:

the memory control means includes an address generator means for generating the memory address for each address transfer; and the memory control means, for at least one type of memory transaction, when using the second interface means, for buffering each memory address generated by the address generator means within the buffer means for at least one clock cycle, such that each address transfer and associated data transfer is presented at the second interface means during the same clock cycle;

wherein the memory control means does not buffer the memory address generated by the address generator means if the memory transaction is a single-beat memory transaction comprising a single address transfer and an associated single data transfer.

* * * * *